(12) United States Patent
Falls et al.

(10) Patent No.: US 12,187,541 B2
(45) Date of Patent: Jan. 7, 2025

(54) MULTI-SECTION CONVEYOR FRAME ASSEMBLY

(71) Applicant: Dorner Mfg. Corp., Hartland, WI (US)

(72) Inventors: Anete Falls, Waukesha, WI (US); Daniel E. Ertel, Oconomowoc, WI (US)

(73) Assignee: Dorner Mfg. Corp., Hartland, WI (US)

( * ) Notice: Subject to any disclaimer, the term of this patent is extended or adjusted under 35 U.S.C. 154(b) by 252 days.

(21) Appl. No.: 17/976,250

(22) Filed: Oct. 28, 2022

(65) Prior Publication Data

US 2024/0140718 A1 May 2, 2024

(51) Int. Cl.
*B65G 21/02* (2006.01)
*B65G 15/62* (2006.01)
*B65G 23/44* (2006.01)

(52) U.S. Cl.
CPC .............. *B65G 21/02* (2013.01); *B65G 15/62* (2013.01); *B65G 23/44* (2013.01); *B65G 2207/30* (2013.01)

(58) Field of Classification Search
CPC .... B65G 21/02; B65G 23/44; B65G 2207/30; B65G 39/12; B65G 21/06; B65G 15/62
USPC .......................................................... 198/841
See application file for complete search history.

(56) References Cited

U.S. PATENT DOCUMENTS

| | | | | |
|---|---|---|---|---|
| 1,401,366 | A * | 12/1921 | Sargent | B65G 21/02 198/841 |
| 2,437,499 | A * | 3/1948 | Benjamin | B65G 21/06 198/830 |
| 5,174,435 | A | 12/1992 | Dorner et al. | |
| 5,421,451 | A * | 6/1995 | Easton | F16B 35/044 198/860.1 |
| 6,170,649 | B1 * | 1/2001 | Radandt | B65G 21/06 198/860.1 |
| 6,422,382 | B1 | 7/2002 | Ertel et al. | |
| 6,871,737 | B2 * | 3/2005 | Ertel | B65G 23/44 198/813 |
| 7,246,697 | B2 * | 7/2007 | Hosch | B65G 21/16 198/841 |
| 7,673,741 | B2 * | 3/2010 | Nemedi | B65G 15/62 198/836.2 |
| 7,681,719 | B2 * | 3/2010 | Hosch | B65G 47/66 198/841 |
| 7,735,638 | B2 | 6/2010 | Hau et al. | |
| 7,997,405 | B2 * | 8/2011 | Karpy | B65G 15/62 198/860.1 |

(Continued)

*Primary Examiner* — Mark A Deuble
(74) *Attorney, Agent, or Firm* — Phillips Lytle LLP; David L. Principe (57) ABSTRACT

A conveyor frame assembly that is constructed from component parts that are formed from stamped sheet metal and assembled after formation. The conveyor frame includes a pair of frame support members that each extend along the length of the conveyor frame from a first end to a second end. The frame support members each include an attachment flange and a side wall that extend perpendicular to a top wall. The frame support members each receive a plurality of cross supports that extend between the spaced side walls. The cross supports are each formed from sheet metal and are attached to the spaced side walls by connectors. First and second pairs of end brackets support end rollers on opposite ends of the conveyor assembly. The first and second end brackets are formed from sheet metal.

20 Claims, 7 Drawing Sheets

(56) References Cited

U.S. PATENT DOCUMENTS

| | | |
|---|---|---|
| 9,617,078 B2 | 4/2017 | Hall |
| 11,267,655 B1 * | 3/2022 | Rottier .................. B65G 15/62 |
| 11,535,455 B1 * | 12/2022 | Ertel ..................... B65G 23/44 |
| 2002/0063044 A1 * | 5/2002 | Reatti .................... B65G 15/60 |
| | | 198/860.1 |
| 2022/0242671 A1 | 8/2022 | Hosch et al. |

* cited by examiner

MULTI-SECTION CONVEYOR FRAME ASSEMBLY

BACKGROUND

The present disclosure generally relates conveyors having a conveyor frame and an endless conveyor belt. More specifically, the present disclosure relates to conveyors having a conveyor frame constructed from components formed from steel plate material that can be assembled/disassembled on-site with few tools and connectors.

Known construction of an endless belt conveyors typically includes a frame assembly, a pair of rollers on each end of the frame assembly, and a conveyor belt engaged between the pair of rollers. One of the rollers is drivingly interconnected with a motor, for rotating the roller thereby to impart movement to the endless conveyor belt. One of the rollers may be movably mounted to the frame assembly so as to provide selective adjustment of the position of the rollers, for providing proper belt tensioning and tracking. Such construction is illustrated in Dorner et al. U.S. Pat. Nos. 5,174,435, 6,422,382 and 9,617,078, the disclosures of which are hereby incorporated by reference.

The conveyor constructions shown in the referenced prior art is a ladder-type construction consisting of a pair of extruded aluminum side frame members interconnected together via a series of transversely extending extruded aluminum cross members, each of which is connected at its ends to the side frame members. While this construction has been found to be highly satisfactory for both manufacturing and operational purposes, it involves certain drawbacks in overall part count and in assembly, in that the ladder-type frame construction requires relatively expensive extruded pieces in the desired length.

It is an object of the present disclosure to provide an endless belt conveyor construction which replaces the prior art extruded aluminum ladder-type frame construction with a modular frame construction in which the components are formed from steel plate material and which can be joined to each other on site to define the conveyor frame. Such conveyor frame will be less expensive to manufacture and will be easier to assemble on site.

SUMMARY

The present disclosure relates to a conveyor frame assembly and a conveyor that incorporates the conveyor frame assembly. The conveyor frame assembly is formed from separate components that can be assembled on-site and that are each formed from a low cost, stamped sheet metal.

The conveyor frame assembly is designed for use in supporting a continuous conveyor belt that extends between first and second ends of the conveyor frame assembly. The conveyor frame assembly includes a pair of frame support members that each extend longitudinally from the first end to the second end. The pair of frame support members each include a generally horizontal top wall that defines a support surface that supports the conveyor belt. The top wall is connected to both a frame side wall and an attachment flange that extend perpendicular to the top wall. In an exemplary embodiment, the frame side wall, the attachment flange and the top wall are formed from the same sheet of metal material.

The conveyor frame assembly further includes a plurality of cross supports that extend between the side walls of the pair of spaced frame support members. The cross supports include a main body and attachment flanges that extend perpendicular to the main body. The attachment flanges are connected to the side walls to provide lateral support for the sides walls of the conveyor frame assembly. In an exemplary embodiment, the cross supports, including the main body and the attachment flanges, are formed from the a sheet of metal material.

In one contemplated embodiment, a conveyor including the conveyor frame assembly further includes a first end roller and a second end roller. The first end roller is rotatably supported by a pair of first end brackets mounted to the side walls of the frame support members. A second end roller is rotatably supported by a pair of second end brackets that are also mounted to the side walls of the frame support members. The first and second end brackets are additional components that are formed from a sheet of metal material.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION

Figure 1:
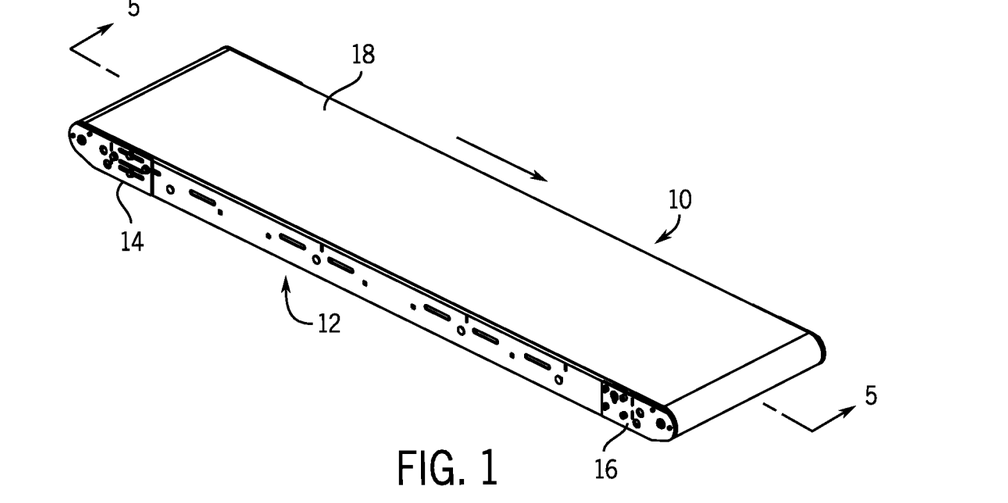
FIG. 1 is a top perspective view of a conveyor assembly including the conveyor frame assembly of the present disclosure.
Figure 2:
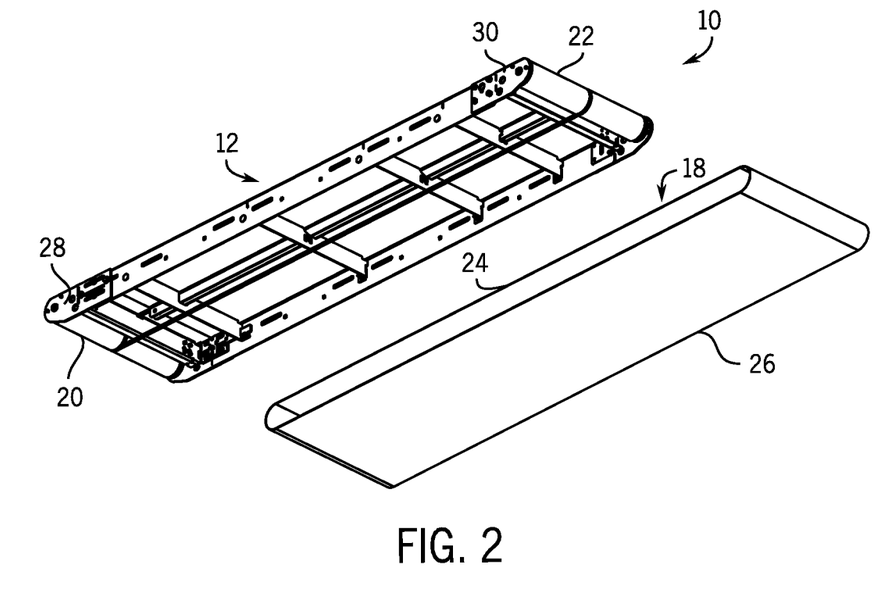
FIG. 2 is a bottom perspective view of the conveyor assembly with the conveyor belt removed to reveal the conveyor frame assembly.

FIGS. 1 and 2 illustrates a conveyor assembly 10 constructed in accordance with the present disclosure. Generally, the conveyor assembly 10 includes a frame assembly 12 that extends between a first end 14 and a second end 16. The conveyor assembly 10 includes a continuous conveyor belt 18 that is entrained between a first end roller 20 and a second end roller 22 that are each rotatably supported at the respective first and second ends 14, 16 of the frame assembly 12. As can be seen in FIG. 2, the conveyor belt 18 includes an upper run 24 and a lower run 26 such that the endless conveyor belt 18 travels along the length of the conveyor assembly 10 to move articles from the first end 14 to the second end 16 in the direction shown by the arrow in FIG. 1. It is contemplated that one of the first or second end rollers 20, 22 can be connected to a drive assembly to cause the movement of the conveyor belt 18 in the direction shown by the arrow in FIG. 1.

In the embodiment shown in FIGS. 1 and 2, the first end roller 20 is rotatably supported by a pair of first end brackets 28 while the second end roller 22 is supported by a pair of second end brackets 30. The first and second end brackets 28, 30 rotatably support the end rollers relative to the rest of the frame assembly. In the embodiment illustrated, the first end brackets 28 are adjustable along the longitudinal length of the conveyor frame assembly 12 to modify the amount of tension imparted to the conveyor belt 18. However, it is contemplated that both of the end rollers, 20, 22 could be stationary in other embodiments.

In the embodiment shown in FIGS. 1 and 2, the frame assembly 12 is formed from modular components that can be assembled together at a work site such that the entire conveyor assembly 10 can be easily assembled and disassembled as desired. Further, the conveyor assembly 10 can be formed from a relatively inexpensive base material, such as stamped steel. The stamped steel material can be painted, powder coated or left in a natural condition depending on the desired look and application. The configuration of the components of the frame assembly 12 allows for a sturdy, durable and relatively inexpensive conveyor assembly 10 to be constructed. The conveyor assembly 10 shown in FIGS. 1 and 2 can be compared to a conventional conveyor assembly in which the components parts of the conveyor frame are typically formed from extruded aluminum. The stamped steel components of the conveyor assembly 10, and specifically the frame assembly 12, reduces the overall cost of the conveyor assembly as compared to a conveyor formed from extruded aluminum components.

Figure 3:
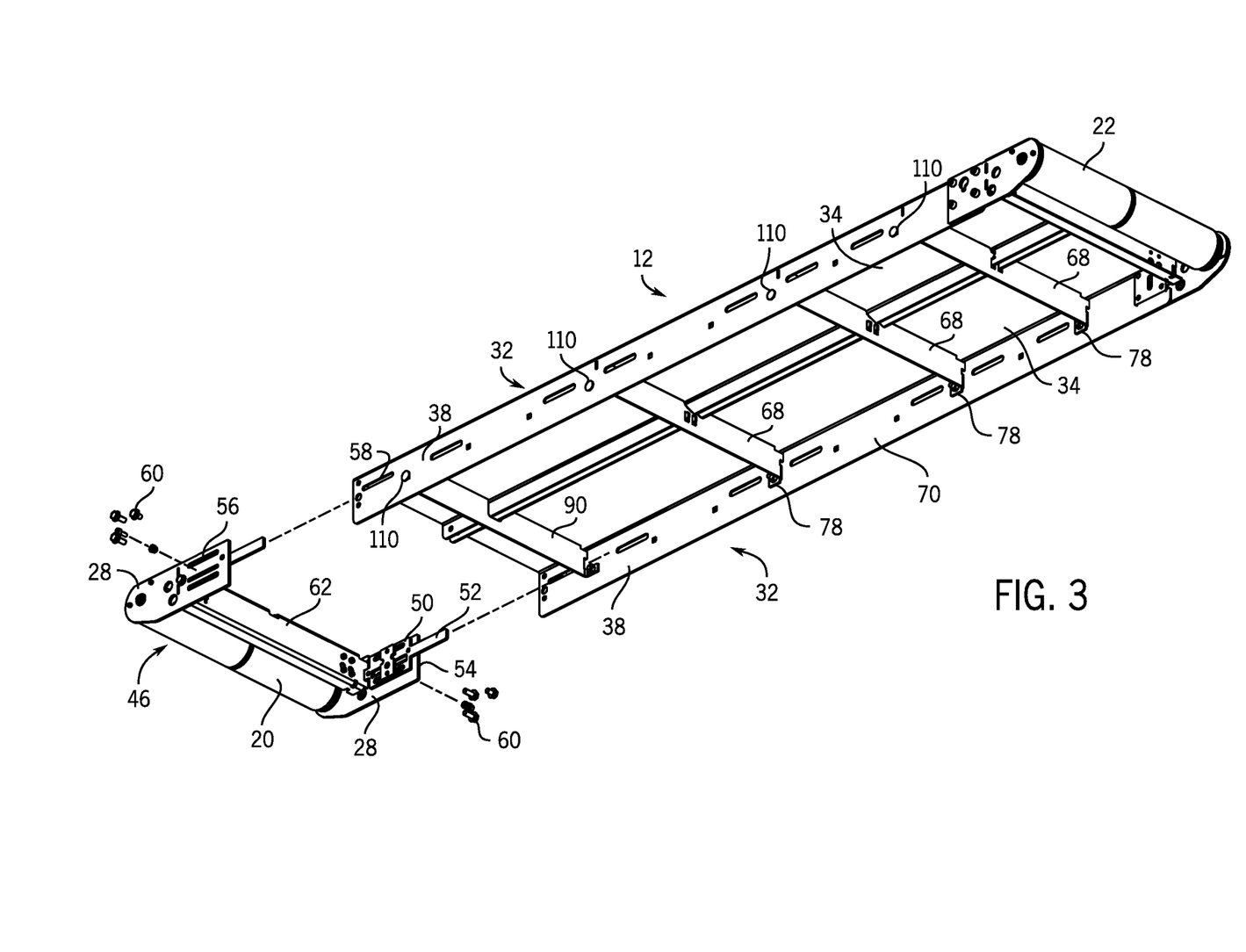
FIG. 3 is a partially exploded bottom perspective view of the conveyor frame assembly of the present disclosure.
Figure 4:
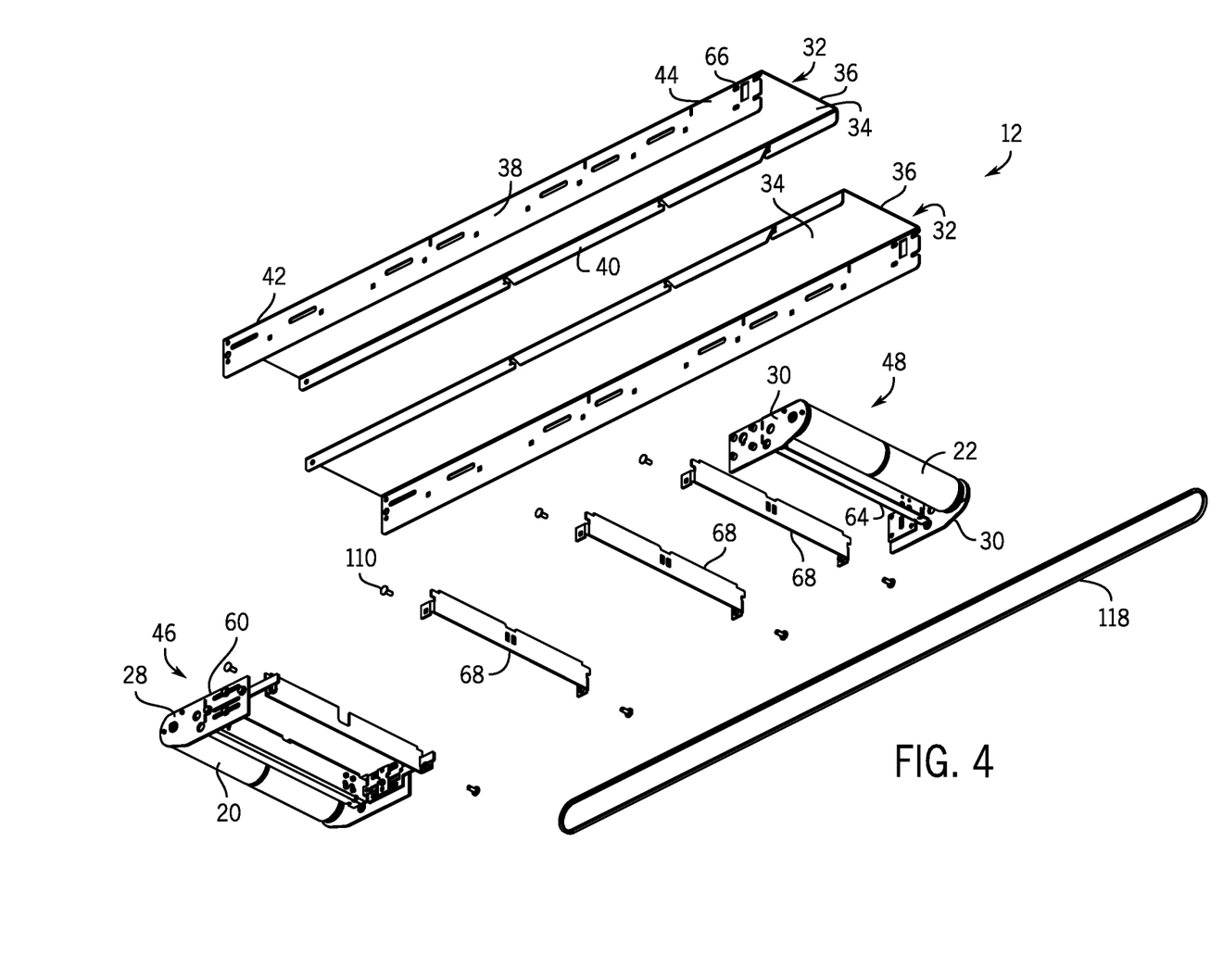
FIG. 4 is an exploded view of the conveyor frame assembly of the present disclosure.
Figure 5:
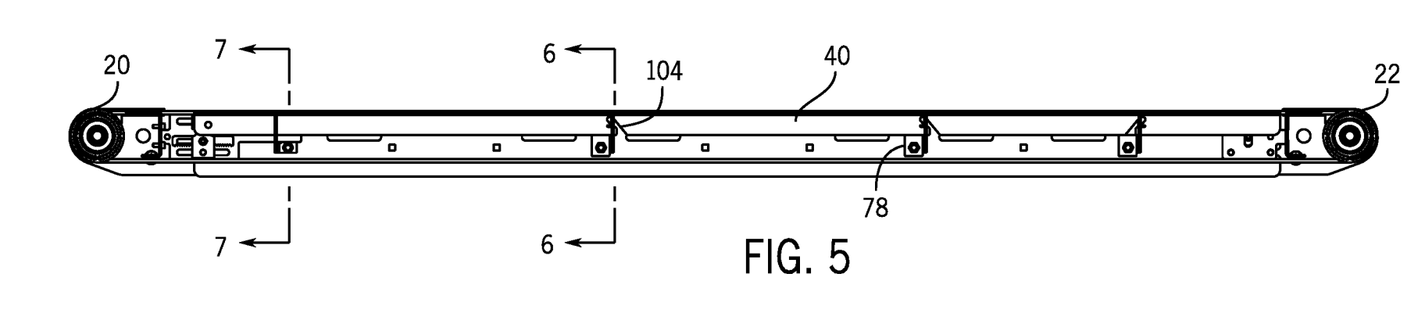
FIG. 5 is a side view of the conveyor frame assembly.

FIGS. 3 and 4 generally illustrate the components required to form the frame assembly 12. In the frame assembly 12 shown in FIGS. 3 and 4, the frame assembly 12 includes a pair of frame support members 32 that are designed to be positioned adjacent to each other to define the overall width of the conveyor frame assembly 12. The pair of frame support member are similar components that are simply mirror images of each other such that one of the frame support members 32 forms the left member and the other forms the right member. Each of the frame support members 32 includes a top wall 34 that is designed to define a generally horizontal top support surface 36. The top support surface 36 of each of the pair of frame support members 32 is designed to define a horizontal support surface for the top run of the continuous conveyor belt.

Each of the frame support members 32 includes a frame side wall 38 and an attachment flange 40 that are located on opposite sides of the top wall 34. Both the frame side wall 38 and the attachment flange 40 extend perpendicular to the top wall 34 as illustrated. In the embodiment shown, the top wall 34, the frame side wall 38 and the attachment flange 40 are formed from a single piece of steel sheet material. In the embodiment illustrated, the entire frame support member 32 is formed from a single plate of steel material that is bent into the shape and form shown. The various cutouts and notches, which will be described in detail below, are formed in the sheet material either before or after the frame side wall 38 and attachment flange 40 are bent into the perpendicular orientation as illustrated.

As illustrated in FIG. 4, the first end 42 of the frame support member 32 has a slightly different configuration than the second end 44 such that the first and second ends 42, 44 can receive different types of end roller assemblies. Specifically, in the embodiment shown in FIGS. 3 and 4, the first end 42 is designed to receive an adjustment roller assembly 46 while the second end 44 is designed to receive a stationary roller assembly 48. The adjustment roller assembly 46 includes the pair of first end brackets 28 and the first end roller 20 while the stationary roller assembly 48 includes the pair of second end brackets 30 and the second end roller 22.

As shown in FIG. 3, the adjustment roller assembly 46 is designed such that the location of the mounting between the pair of spaced first end brackets 28 and the pair of spaced side walls 38 can be adjusted to modify the amount of tension in the conveyor belt when the conveyor belt is entrained between the pair of spaced first and second end rollers 20, 22. As illustrated in FIG. 3, adjustment brackets 50 are mounted to the inner surface of each of the pair of first end brackets 28. The adjustment brackets 50 include a support arm 52 that extends past the end 54 of the first end brackets 28. The support arms 52 help to support the pair of spaced first end brackets 28 during adjustment.

Each of the end brackets 28 further includes an adjustment slot 56 that is aligned with a similar adjustment slot 58 formed in the frame side wall 38. The adjustment slots 56, 58 receive a connector 60 that allows the first end brackets 28 to be securely attached to the frame side walls in the desired position. the connectors 60 can be loosened and the position of the end brackets 28 adjusted to modify the tension in the conveyor belt. Once adjusted, the connectors 60 can be tightened to hold the end brackets 28 in the adjusted position.

As shown in FIGS. 3 and 4, a cross support 62 extends laterally between the pair of spaced end brackets 28 to provide lateral support between the pair of end brackets 28. The cross support 62 is spaced slightly from the first end roller 20 and provides additional stability for the adjustment roller assembly 46. The cross support 62 is formed from a similar sheet of stamped steel material to provide additional stability for the entire adjustment roller assembly 46.

Referring back to FIG. 4, the stationary roller assembly 48 also includes a support bar 64 that is connected between the pair of spaced second end brackets 30. The support bar 64 provides lateral support for the pair of spaced end brackets 30 and is spaced slightly from the second end roller 20. The pair of second end brackets 30 each include a series of attachment openings that allow the end brackets 30 to be securely mounted to corresponding attachment holes 66 formed at the second end 44 of the frame support member 32.

As illustrated in FIGS. 3 and 4, a plurality of cross supports 68 are positioned along the length of the entire frame assembly 12. Each of the cross supports 68 are identical components and are each formed from a stamped piece of steel plate material. Each of the cross supports 68 is designed to extend across the open interior of the frame assembly 12 beneath the top walls 34 of the adjacent frame support members 32. Specifically, each of the cross supports 68 is attached to the inner surface 70 of each of the pair of spaced frame side walls 38. The cross supports 68 provide lateral support for the frame side walls 38 and are used to securely join the pair of adjacent but spaced frame support members 32.

Figures 8, 9:
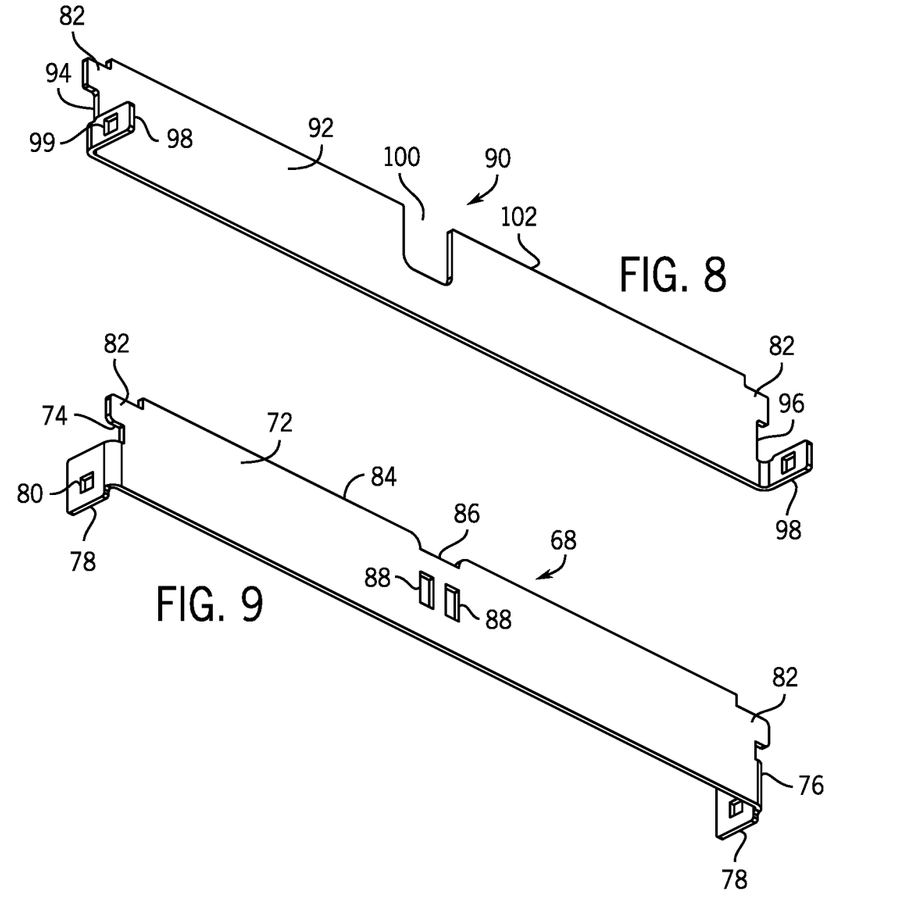
FIG. 8 is a bottom perspective view of one of the cross supports.
FIG. 9 is a bottom perspective view of the end support.

FIG. 9 illustrates the details of one of the plurality of cross supports 68. The cross support 68 includes a main body 72 that extends from a first end 74 to a second end 76. The first and second ends 74, 76 each include an attachment tab 78 that is bent generally 90 degrees relative to the main body 72 such that the attachment tab 78 is generally perpendicular to the main body 72. Each of the attachment tabs 78 includes an attachment opening 80 that is sized to receive a connector as will be described below. Both of the first and second ends 74, 76 further include an alignment finger 82 that is used to guide the alignment of the entire cross support 68 relative to the frame support members 32 during installation.

As can be seen in FIG. 9, the top edge 84 of the main body 72 includes a recessed center slot 86 that is aligned with a pair of slots 88 formed within the main body 72. The slots 88 are removed portions of the main body 72 that are located below and aligned with the center slot 86. The slots 88 can be formed by punching out portions of the steel plate material that is used to form the entire cross support 68.

In addition to the cross supports 68 shown in FIG. 3, the frame assembly 12 further includes an end cross support 90 that has a slightly different configuration from the cross supports 68. The end cross support 90 is shown in FIG. 8. The end cross support 90 includes a similar main body 92 that extends between a first end 94 and a second end 96. Both the first and second ends 94, 96 include a similar attachment tab 98 that is used to attach the end cross support 90 between the pair of spaced side walls 38. The end cross support 90 includes identical alignment fingers 82 at each of its first and second ends. Unlike the cross support 68 shown in FIG. 9, the end cross support 90 includes a single center channel 100 that is a removed portion of the main body 92 and extends into the main body 92 from the top edge 102.

Figures 10, 11:
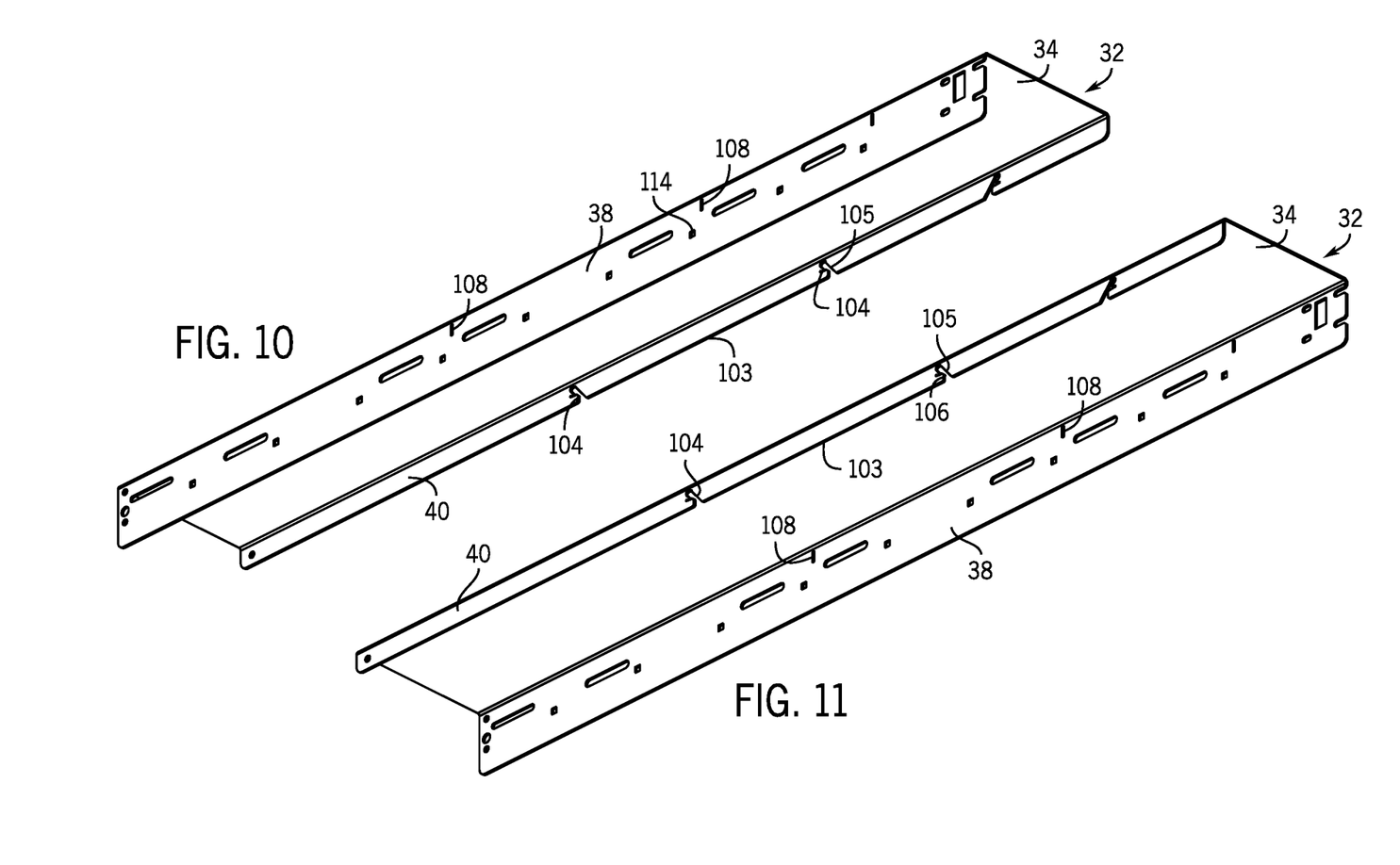
FIG. 10 is a bottom perspective view of a first frame support member.
FIG. 11 is a bottom perspective view of a second frame support member.

FIGS. 10 and 11 illustrate the details of the pair of frame support members 32, and specifically the configuration of the attachment flanges 40 on each of the frame support brackets 32. As discussed previously, each of the attachment flanges 40 extends perpendicular to the top wall 34. Each of the attachment flanges 40 includes a series of attachment notches 104 that are spaced along the length of the attachment flange 40. Each of the attachment notches 104 includes an open channel 105 that extends upward at an angle from a lower edge 103 of the attachment flange 40. The attachment notches 104 are removed portion of the attachment flange 40 and are designed to receive and engage with one of the cross supports 68 as best shown in FIGS. 12 and 13.

Figure 12:
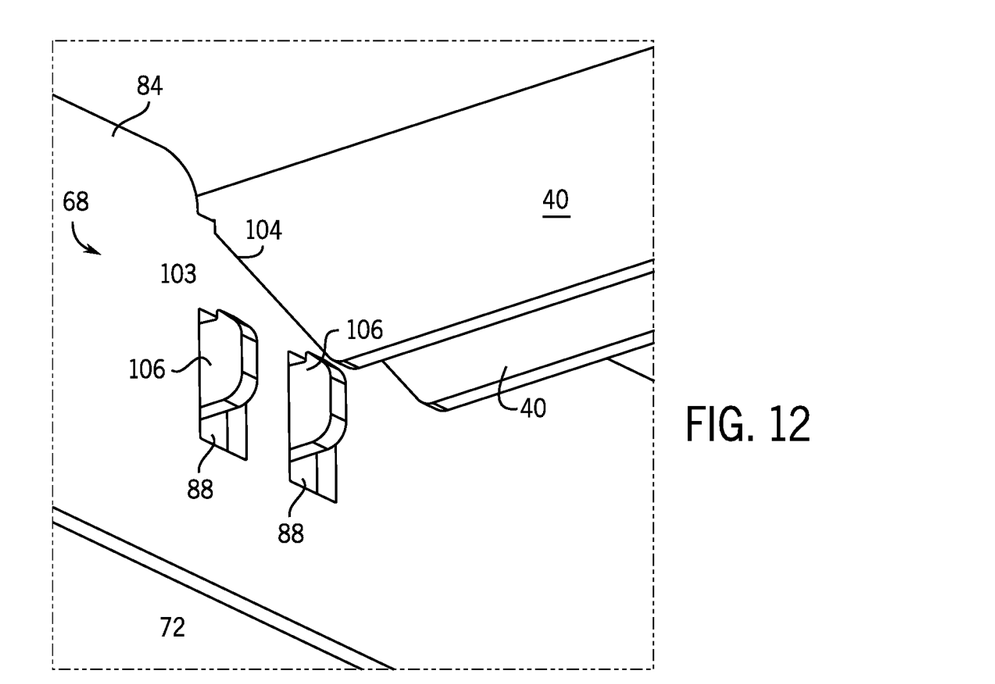
FIG. 12 is a front perspective view showing the interaction between one of the cross supports and the attachment flanges of the pair of frame support members.
Figure 13:
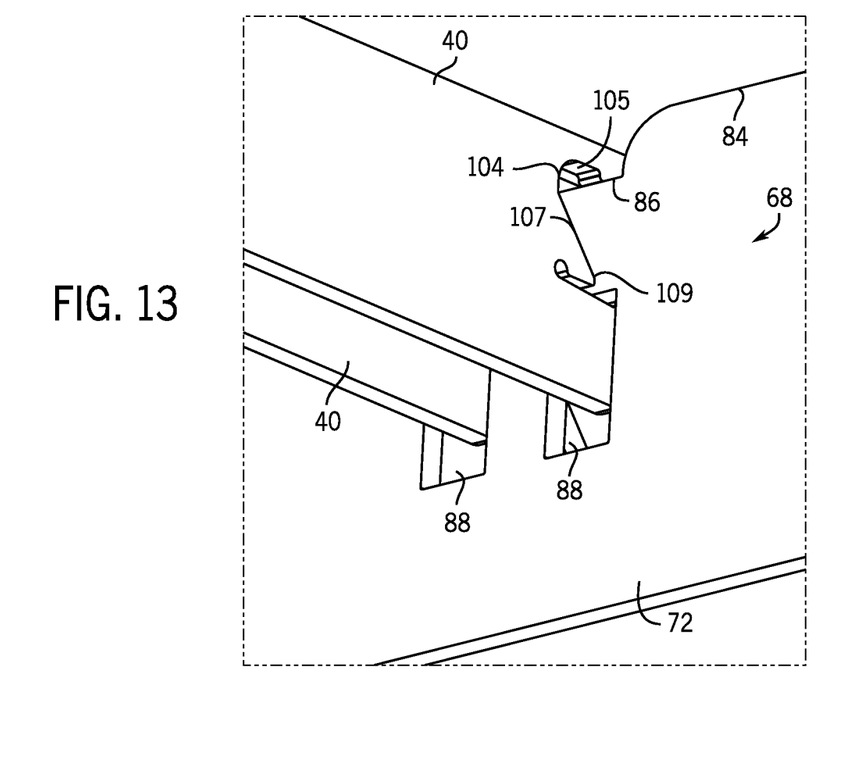
FIG. 13 is a back perspective view showing the interaction between one of the cross supports and the attachment flanges of the pair of frame support members.

As shown in FIG. 12, the attachment notches 104 each include a protruding shoulder portion 106 that extends into the open channel 105 of the attachment notch 104. The protruding shoulder portion 106 includes a lip 103 that is configured to engage the upper wall of one of the slots 88 formed in the cross support 68. As shown in FIG. 13, the attachment notch 104 further includes an angled back wall 107 having a lower end 109 that contacts the flat surface of the main body 72 to provide support for the cross support 68 in the position shown. In this manner, the cross support 68 can engage the attachment flange 40, and specifically the shoulder portion 106 of the attachment notch 104, to provide support for the pair of spaced attachment flanges 40. As can be understood in FIGS. 12 and 13, the cross support 68 can be installed along the pair of attachment flanges 40 without any tools or connectors.

Referring back to FIGS. 10 and 11, the frame side walls 38 include a series of slots 108 that are generally aligned with the attachment notches 104 formed in the spaced attachment flange 40. The slots 108 are designed to receive and retain the alignment fingers 82 formed on each end of the cross supports 68 shown in FIG. 9 and the end cross support 90 shown in FIG. 8. The receipt of the alignment finger 82 in one of the slots 108 can be seen in FIG. 6 as well.

Figure 6:
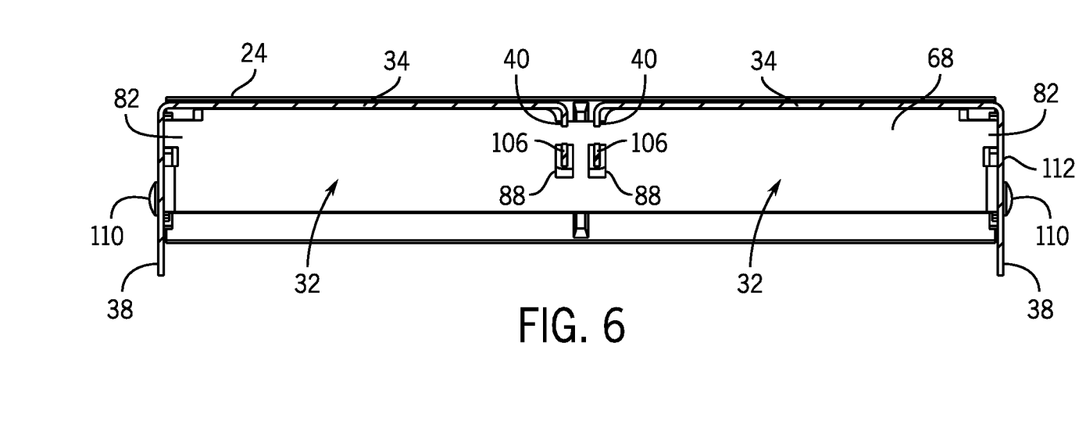
FIG. 6 is a section view as taken along line 6-6 of FIG. 5 showing one of the cross supports mounted between the pair of spaced frame support members.

As can be understood in FIG. 6, the cross support 68 provides support for the attachment flanges 40 of the two frame support members 32 and are securely held in place between the pair of frame support members 32 by the connectors 110 shown in FIG. 6. The connectors 110 are each in contact with the outer surface 112 of the frame side wall 38 and are each received within one of the attachment tabs 78. In the embodiment shown, each of the connectors includes a head and a threaded shaft that passes through the attachment opening 80 formed in the attachment tab 78. The threaded shaft receives a corresponding threaded nut to hold the connector in the position shown.

Figure 7:
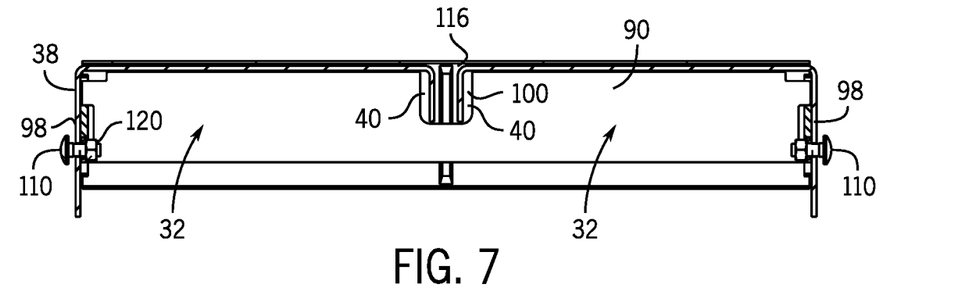
FIG. 7 is a section view as taken along line 7-7 of FIG. 5 showing the end support mounted between the pair of spaced frame support members.

As indicated previously, the end cross support 90 also includes an attachment tab 98 that includes an attachment opening 99. As shown in FIG. 7, the connectors 110 thus hold the cross supports 68 and the end cross support 90 in the position as shown in FIG. 3. As can be seen in FIGS. 10 and 11, an access opening 114 is generally aligned with both the slot 108 and the attachment notches 104 such that the cross support 68 can be located in the desired position and secured in place as shown in FIG. 3.

FIG. 7 illustrates an end view of the end cross support 90. As shown in FIG. 7, the center channel 100 is sized to receive both of the attachment flanges 40 of the adjacent frame support members 32. When the conveyor frame assembly is constructed, the attachment flanges 40 are spaced by a center channel 116 that extends along the entire length of the conveyor frame assembly. The open center channel 116 can receive a guide lug formed on the inner surface of the conveyor belt. The guide lug is schematically illustrated in FIG. 4 by reference numeral 118. The guide lug 118 is formed on the interior surface of the conveyor belt and is used to guide the conveyor belt and restrict lateral movement of the conveyor belt during operation. Although the guide lug 118 is shown as a separate element in FIG. 4, it should be understood that the guide lug 118 is formed on the inner surface of the conveyor belt 18 and is not a separate component.

Referring back to FIG. 7, the connector 110 is shown extending through the frame side wall 38 and receiving a nut 120. The combination of the connector 110 and the nut 120 holds the end cross support 90 in the position illustrated. Similar combinations of the connector 110 and a nut 120 hold the cross supports 68 in place as was described.

Although connectors 110 are illustrated as being used to connect both the cross supports 68 and the end cross support 90 to the pair of side walls, it should be understood that other methods of connection are contemplated as being within the scope of the present disclosure. As an example, the attachment flanges on the cross supports and the end cross support could be spot welded to the inner surface of the side walls. Such method would create a more permanent connection and would not allow for easy disassembly but could be used within the scope of the present disclosure.

As can be understood by the drawings and the description above, the conveyor assembly of the present disclosure can be shipped in separate components and assembled onsite by utilizing only the connectors described. Initially, the cross supports 68 and end support 90 are used to combine the pair of frame support members 32. Once the frame support members 32 are combined, the adjustment roller assembly 46 and the stationary roller assembly 48 are attached to opposite ends of the conveyor frame. Once installed, the conveyor belt 18 can then be positioned over the length of the conveyor frame and the conveyor can be operated in a known manner. In the preferred embodiment of the present disclosure, the frame support members 32, cross supports 68 and the end cross support are all formed from sheets of a metallic material, such as steel. Each of the sheets are bent and cut into the desired shape and the required access notches, slots and guides are formed. In this manner, the conveyor assembly of the present disclosure can be created without the need for any expensive, extruded aluminum components as in the prior art.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A conveyor frame assembly for supporting a continuous conveyor belt that extends between a first end and a second end of the conveyor frame assembly, the assembly comprising:
   at least a pair of frame support members that each extend longitudinally from the first end to the second end and are positioned laterally adjacent to each other, wherein each of the frame support members includes a support surface, a frame side wall and an attachment flange, wherein the frame side wall and the attachment flange are perpendicular to the support surface; and
   a plurality of cross supports that each receive the attachment flanges of the frame support members and are removably attached to the frame side walls.

2. The conveyor frame assembly of claim 1 wherein the pair of frame support members and the plurality of cross supports are each formed from stamped steel.

3. The conveyor frame assembly of claim 1 wherein each of the plurality of cross supports extends between the pair of spaced frame side walls and is connected to each of the frame side walls by a removable connector.

4. The conveyor frame assembly of claim 3 wherein each of the plurality of cross supports includes an attachment tab on a first end and a second end of a body of the cross support, wherein the attachment tabs extend perpendicular to the body of the cross support.

5. The conveyor frame assembly of claim 4 wherein each of the attachment tabs receives one of the connectors such that the attachment tab is held in contact with one of the frame side walls by the connector.

6. The conveyor frame assembly of claim 1 wherein each of the attachment flanges includes a plurality of removed access notches spaced along the length of the frame support member, wherein the access notches are configured to receive one of the cross supports.

7. The conveyor frame assembly of claim 6 wherein each of the cross supports includes a pair of access opening sized to be received within the access notches of the attachment flanges such that the cross supports support the attachment flanges of the pair of frame support members.

8. The conveyor frame assembly of claim 1 further comprising:
   a first end roller mounted to the first end of the conveyor assembly;
   a pair of first end brackets mounted to the frame side walls of the pair of frame support members and configured to rotatably support the first end roller;
   a second end roller mounted to the second end of the conveyor assembly; and
   a pair of second end brackets mounted to the frame side walls of the pair of frame support members and configured to rotatably support the second end roller.

9. The conveyor frame assembly of claim 8 wherein the pairs of first and second end brackets are formed from stamped steel.

10. The conveyor frame assembly of claim 1 wherein the attachment flanges of the pair of frame support member are spaced from each other by an open center channel.

11. The conveyor frame assembly of claim 8, wherein the attachment flanges of the pair of frame support member are spaced from each other by an open center channel.

12. A conveyor, comprising:
    a continuous conveyor belt;
    a conveyor frame assembly for supporting the continuous conveyor belt, the conveyor frame assembly extending between a first end and a second end, the conveyor frame assembly comprising:
       at least a pair of frame support members that each extend longitudinally from the first end to the second end and are positioned laterally adjacent to each other, wherein each of the frame support members includes a support surface, a frame side wall and an attachment flange, wherein the frame side wall and the attachment flange are perpendicular to the support surface;
       a plurality of cross supports that each receive the attachment flanges of the frame support members and are removably attached to the frame side walls;
    a first end roller mounted to the first end of the conveyor frame assembly;
    a pair of first end brackets mounted to the frame side walls of the pair of frame support members and configured to rotatably support the first end roller;
    a second end roller mounted to the second end of the conveyor frame assembly; and
    a pair of second end brackets mounted to the frame side walls of the pair of frame support members and configured to rotatably support the second end roller.

13. The conveyor of claim 12 wherein the frame support members and the cross supports are formed from stamped steel.

14. The conveyor of claim 12 wherein each of the plurality of cross supports extends between the pair of spaced frame side walls and is connected to each of the frame side walls by a removable connector.

15. The conveyor of claim 14 wherein each of the plurality of cross supports includes an attachment tab on a first end and a second end of a body of the cross support, wherein the attachment tabs extend perpendicular to the body of the cross support.

16. The conveyor of claim 15 wherein each of the attachment tabs receives one of the connectors such that the attachment tab is held in contact with one of the frame side walls by the connector.

17. The conveyor of claim 12 wherein each of the attachment flanges includes a plurality of removed access notches spaced along the length of the frame support member, wherein the access notches are configured to receive one of the cross supports.

18. A conveyor frame assembly for supporting a continuous conveyor belt that extends between a first end and a second end of the conveyor frame assembly, the assembly comprising:
    at least a pair of frame support members that each extend longitudinally from the first end to the second end and are positioned laterally adjacent to each other, wherein each of the frame support members includes a support surface, a frame side wall and an attachment flange, wherein the frame side wall and the attachment flange are perpendicular to the support surface; and a plurality of cross supports that each include a main body and a pair of attachment tabs on first and second ends of the main body that each extend perpendicular to the main body, wherein the main body receives the space attachment flanges of the frame support members and are removably attached to the frame side walls by the attachment tabs.

19. The conveyor frame assembly of claim 18 wherein each of the attachment flanges includes a plurality of removed access notches spaced along the length of the frame support member, wherein the access notches are configured to receive one of the cross supports.

20. The conveyor frame assembly of claim 18 wherein the pair of frame support members and the plurality of cross supports are formed from stamped steel.

\* \* \* \* \*